Patented Jan. 20, 1931

1,789,299

UNITED STATES PATENT OFFICE

JESSE O. BETTERTON, OF OMAHA, NEBRASKA, ASSIGNOR TO AMERICAN SMELTING AND REFINING COMPANY, OF NEW YORK, N. Y., A CORPORATION OF NEW JERSEY

PROCESS OF FORMING AND PURIFYING ZINC CHLORIDE

No Drawing.  Application filed September 1, 1927.  Serial No. 217,005.

This invention relates to the formation and purification of zinc chloride from the small percentages of zinc remaining in the lead bullion after desilverization by the Parke's process.

This invention provides specifically for the removal of zinc when contained in comparatively small quantities in a mass of lead bullion and the formation of a valuable by-product therefrom. For example, in the Parke's process of lead refining after desilverization has been accomplished by means of zinc additions, the resulting lead bullion frequently contains zinc in quantities of approximately one-half of one per cent. This zinc must be removed before the lead is commercially saleable as refined lead. The removal should be accomplished in such a manner that a minimum amount of both lead and zinc is lost during the process.

This invention further provides for the purification of the zinc products obtained during the removal of the zinc from the lead bullion and the preparation of such products in a suitable form for further commercial use. When the zinc has been removed from the lead in the form of a zinc chloride slag, this further purification may be accomplished by remelting the slag in the presence of an excess of zinc which will replace any lead which may be incorporated therein and produce substantially pure zinc chloride. This latter substance is a very valuable by-product.

The process of refining lead in accordance with the present invention comprises reacting the molten lead with a sufficient amount of chlorine to unite with the zinc contained therein and form zinc chloride. This substance then floats upon the surface of the lead and may be removed by skimming. This zinc chloride slag frequently contains a substantial percentage of lead in the form of lead chloride or lead oxychloride which may be removed by remelting in a suitable container and adding an excess of metallic zinc to replace the lead contained in the lead chloride or oxychloride and produce a further quantity of zinc chloride. The lead may then be returned to the dezincing process and the zinc chloride sold in any desired form.

Although the novel features which are believed to be characteristic of this invention will be particularly pointed out in the claims appended hereto, the invention itself, as to its objects and advantages, the mode of its operation and the manner of its organization may be better understood by referring to the following description in which a particular commercial embodiment thereof is disclosed. It will be understood however, that the processes and the steps thereof may be modified in various respects without departing from the broad spirit and scope of the invention.

In the following description and in the claims, the various steps in the process and the details comprising the invention will be identified by specific names for convenience but they are intended to be as generic in their application as the art will permit.

The process in accordance with the present invention comprises heating a quantity of lead bullion after desilverization by the Parke's process to a temperature of between 650° and 750° F and continuously removing portions of the molten lead from the bath and passing the same through a reaction chamber containing chlorine. During this process it is necessary to apply but very little external heat since the reaction is exo-thermic. The molten lead in passing through the chlorine chamber will absorb an amount of chlorine depending upon the rate of passage, which will unite with the zinc and form zinc chloride.

When the mixture is returned to the bath, the zinc chloride will float upon the surface as a slag, whence it may be readily removed as by skimming. It has been found preferable to maintain the temperature of the reaction within the above specified limits in order to prevent the apparatus from becoming filled with solid lead and in order to prevent undue corrosion of the parts or loss of zinc chloride due to fuming.

The zinc chloride is of a deep bluish gray, and may be readily distinguished from lead chloride which appears on the surface as a white slag. Due to the selective action of the chlorine, zinc chloride will be first formed, but when the zinc has been completely removed any excess of chlorine will react with the lead with the formation of lead chloride. When this is noticed on the surface of the bath, the process should be continued for a sufficient length of time to again pass the entire amount of lead through the reaction cylinder and thereby insure the complete removal of any zinc which may be contained therein.

The slag thus formed may be skimmed from the molten lead bath and removed into a suitable apparatus for the subsequent deleading process. It may be desirable to delead in one operation slags produced in a plurality of dezincing operations. Consequently the first slags removed should be maintained at a low temperature prior to deleading, in order to prevent absorption of water which would interfere with the reactions by causing foaming.

When a deleading operation is to be started and the various slags have been placed in the deleading kettle, the temperature of the mass should be raised to between 730° and 760° F., that is, to the original temperature of the slag. Zinc may then be added to the bath for displacing the lead and uniting with the chlorine with the formation of additional quantities of zinc chloride. An excess of zinc should be employed to insure complete elimination of the lead and other metallic impurities.

The deleading operation may preferably be carried on by pumping a portion of the molten chloride from the middle part of the kettle and reintroducing it into the metallic bath occupying the bottom part of the kettle at a point immediately below the surface thereof that is, below the slag-metal interface whereby a continuous circulation of the slag is obtained. The speed of the pump should be regulated to avoid undue cooling of the metal and mix the slag and zinc throughout the entire mass.

The reactions which are relied upon during the deleading operation are as follows:

$$Pb_2OCl + 2Zn = Zn_2OCl + 2Pb$$
$$PbCl_2 + Zn = ZnCl_2 + Pb$$

The amount of zinc required to react with the lead contained in the slag as lead chloride and lead oxychloride may consequently be computed and the proper quantity thereof added to the deleading kettle.

It has been found in practicing this invention that a 40 ton lead kettle will hold approximately 7 tons of zinc chloride in addition to the lead bath in the bottom thereof. The theoretical amount of zinc required for deleading this quantity of zinc chloride would be 112 pounds. In order to insure an excess, however, and to hasten the reaction, it has been found desirable to add 175 pounds of zinc for each operation. The slag itself usually contains sufficient metallic lead to provide a bath in the bottom of the deleading kettle, a 7 ton charge yielding approximately 1120 pounds of metallic lead.

Of the 175 pounds of zinc added, approximately 112 pounds are used in the deleading operation, the excess remaining in solution in the metal bath. Consequently after several operations the metal bath will become saturated with zinc and an alloy formed which may be difficult to melt. The presence of such an alloy may be ascertained by examining a portion of the metal bath at the bottom of the kettle, and in case too rich an alloy is found, the addition of further quantities of zinc are omitted for several operations until the required fluid melt is again obtained.

After the operation has been completed, the molten lead may be tapped from the lower portion of the kettle and the molten zinc chloride tapped from the upper portion thereof. The lead may be utilized in another deleading operation since the zinc contained therein will be capable of displacing further quantities of lead with the consequent production of zinc chloride. Any accumulation of metal over and above that required in the deleading operation may be returned to the dezincing kettles for further refining.

Completion of the reaction may be determined by removing a sample from the deleading kettle and adding a quantity of sulphuric acid thereto. Any lead present will immediately be precipitated as lead sulphide. When a point is reached at which no further precipitate is formed, the lead content of the slag will be under one-tenth of one percent. At this point, the bath may be tapped, the lead or lead alloy being first removed.

The first portion of the zinc chloride removed is run into a shallow pot until free from metallic impurities and returned to the subsequent charge. The remainder of the zinc chloride is then run into drums and stored for commercial use. Slags have been produced by this method having the following analysis:

| | |
|---|---|
| Pb | .02 |
| Fe | .013 |
| Zn | 47.3 |
| ZnCl$_2$ | 98.5 |
| Residue | 1.5 |

By means of the above described process, not only is the zinc completely removed from the lead without any appreciable loss of metallic lead, but the zinc is removed in such form as to be commercially usable and saleable. By carrying on the operation within the above specified temperature range, the volatilization and loss of zinc chloride is substantially prevented.

The cost of the operation is comparatively low since it is unnecessary to apply external heat during the dezincing operation, and the amount of material passing through the deleading kettles represents only a small proportion of the original charge.

If desired, the zinc and chlorine may be separated and recovered from the zinc chloride and used in the desilverization and dezincing of further quantities of lead in the Parke's process. The operation may thus be carried on cyclically with the addition from time to time of only such further quantities as may be necessary to replenish the supply.

Although certain novel features of the invention have been shown and described and are pointed out in the annexed claims, it will be understood that various omissions, substitutions and changes in the several steps of the process and in its operation may be made by those skilled in the art without departing from the spirit of the invention.

What is claimed is:

1. The process of purifying zinc chloride containing impurities such as lead, lead chloride and lead oxychloride, which comprises melting said zinc chloride and an excess of zinc metal in a suitable container, recirculating portions of the molten salt material through the adjacent metal in said container allowing a slag of purified zinc chloride to form on the surface of the bath and removing said slag therefrom.

2. The process of purifying zinc chloride containing impurities such as lead, lead chloride and lead oxychloride, which comprises melting said zinc chloride and an excess of zinc in a suitable container continuously removing a portion of the top layer of molten salt material from the container, and returning said portion to a point below the surface of the subjacent metal whereby a continuous circulation of the salt is obtained, allowing the zinc chloride to separate from the metallic impurities and form a slag on the surface thereof and removing the slag therefrom 3. The process of purifying zinc chloride containing impurities such as lead, lead chloride and lead oxychloride, which comprises melting said zinc chloride and an excess of zinc in a suitable container, removing portions of the molten salt material from the bath and returning said portion to a point below the surface of the subjacent molten metal whereby a continuous circulation of the salt may be obtained, allowing the zinc chloride to form a slag on the surface of the bath and separately removing the zinc chloride by tapping said container above the level of the impurities.

4. The process of purifying zinc chloride containing impurities such as lead, lead chloride and lead oxychloride, which comprises melting said zinc chloride and an excess of zinc in a suitable container, passing aliquot portions of the said impure salt in finely divided form into and through the subjacent metal bath, whereby to scour the salt and present the impurities therein to the metal in optimum reactive condition, allowing the slag of purified zinc chloride thus formed to collect on the surface of the bath, and removing said slag from the said bath.

5. The process of purifying zinc chloride containing impurities such as lead, lead chloride and lead oxychloride, which comprises melting said zinc chloride and an excess of zinc in a suitable container, said excess of zinc being figured on the amount of reactable impurities present in the salt to be purified, passing aliquot portions of the said impure salt in finely divided form into and through the subjacent metal bath, whereby to scour the salt and present the impurities therein to the metal in optimum reactive condition, allowing the slag of purified zinc chloride thus formed to collect on the surface of the bath, and removing said slag from the said bath.

In testimony whereof I have hereunto set my hand.

JESSE O. BETTERTON.